United States Patent [19]

Zabrocki et al.

[11] 4,318,832
[45] Mar. 9, 1982

[54] AQUEOUS DISPERSIONS OF EPOXIDE COMPOUNDS

[75] Inventors: Karl Zabrocki, Buettgen; Hans Schulze, Cologne; Franz Weider, Leverkusen; Wolfgang Wellner, Cologne; Wolfgang Schartau, Odenthal, all of Fed. Rep. of Germany

[73] Assignee: Bayer Aktiengesellschaft, Fed. Rep. of Germany

[21] Appl. No.: 181,066

[22] Filed: Aug. 25, 1980

[30] Foreign Application Priority Data

Aug. 29, 1979 [DE] Fed. Rep. of Germany ....... 2934951

[51] Int. Cl.³ .............................................. C08L 63/02
[52] U.S. Cl. .................................... 523/402; 428/378
[58] Field of Search .................. 260/29.2 EP, 29.2 E, 260/29.2 TN, 29.6 NR, 22 CQ; 525/438

[56] References Cited

U.S. PATENT DOCUMENTS

3,888,812 6/1975 Plettner ...................... 260/29.2 EP
3,983,056 9/1976 Hosoda et al. ...................... 260/29.2
4,029,620 6/1977 Chen ............................ 260/29.2 EP

FOREIGN PATENT DOCUMENTS

2037523 10/1971 Fed. Rep. of Germany .
2606284 10/1976 Fed. Rep. of Germany .

*Primary Examiner*—Theodore E. Pertilla
*Attorney, Agent, or Firm*—Connolly and Hutz

[57] ABSTRACT

An aqueous dispersion of an epoxide compound comprising water, one or more water-insoluble 1,2-epoxide compounds having mol weights $\overline{M}n$ of from between 150 and 3000 and an emulsifying system comprising:

(A) from 9.5 to 35% by weight of at least one polyester resin containing carboxyl groups having an acid number of from 10 to 50 mg KOH/g substance and a molecular weight $\overline{M}n$ of from 400 to 4000, at least 30% of the carboxyl groups being neutralized;

(B) from 0.5 to 25% by weight of at least one emulsifier having an HLB-value $\geq 15$ and represented by the formula:

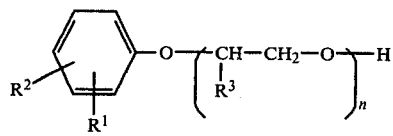

wherein
$R^1$ represents a $C_1$–$C_{16}$-alkyl group,
$R^2$ represents H or a $C_1$–$C_{16}$-alkyl group,
$R^3$ represents H or methyl,
n represents a number from 10 to 50;

(C) from 40 to 90% by weight of at least one emulsifier having an HLB-value of 15 and the general formula:

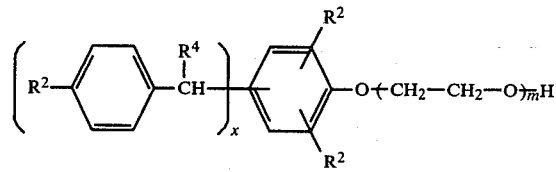

wherein $R^2$ is previously defined, $R^4$ represents $C_1$–$C_4$-alkyl group, x is a number of from 2 to 3, and m is a number from 15 to 100, the total of the percentage contents from A, B, and C being 100%.

6 Claims, No Drawings

AQUEOUS DISPERSIONS OF EPOXIDE COMPOUNDS

The present invention relates to aqueous dispersions of 1,2-epoxide compounds, and in particular to those which are used in coating technology.

The term "aqueous dispersions" is understood in the following to designate heterogeneous systems in which the resin phase is distributed in the continuous water phase in the form of particles having a diameter of from 0.05 to 10μ.

An important advantage of these types of aqueous dispersions in respect of the conventional form of a solution of the resin in an organic solvent, consists in the fact that the organic solvent can preferably be completely avoided. Solvents are usually poisonous and inflammable; therefore, they are a source of danger during the preparation, storage, transport and packing of epoxy resin systems and they lead to a contamination of the environment.

Attempts have therefore already been made to replace a part of the solvent, which is used in the conventional method, with water. For example, German Offenlegungsschrift No. 2,606,284, describes a method in which aqueous epoxy resin dispersion containing a solvent are presented. However, using these systems, only an intermediate step is achieved on the way to the required systems which are solvent-free.

Another type of epoxy resin dispersion is described, for example, in U.S. Pat. No. 3,983,056 and German Offenlegungsschrift No. 2,313,051. Here, solvents can be completely dispensed with, but in order to produce stable epoxy resin dispersions, a hardener, e.g. a polyamine must be added. This hardener must also evidently promote the formation of the emulsion. However, according to their chemical nature, systems containing hardeners are unstable, since, on storage, they commence cross-linking prematurely, particularly at higher temperatures which result when the uncooled storage containers are subjected to sunshine.

If however, the hardener is omitted from these systems, then unstable dispersion are obtained (see comparative experiments (a) and (b)).

The object of the present invention was the preparation of stable aqueous dispersions of 1,2-epoxide compounds. Surprisingly, this object could be achieved by using a certain emulsifying system.

The present invention provides aqueous dispersions of 1,2-epoxide compounds consisting of water, one or more water-insoluble, 1,2-epoxide compounds having molecular weights $\overline{M}n$ of between 150 and 3000, preferably from 200 and 2000 and an emulsifying system, characterised in that the emulsifying system consists of:

(A) from 9.5 to 35% by weight, preferably from 10 to 30% by weight of at least one polyester resin containing carboxyl groups having acid numbers of from 10 to 50 mg KOH/g substance and molecular weights $\overline{M}n$ of from 400 to 4000, at least 30% of the carboxyl groups being neutralised;

(B) from 0.5 to 25% by weight, preferably from 5 to 15% by weight of at least one emulsifier having an HLB-value $\geq 15$ and the structure:

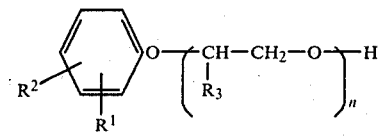

wherein
$R^1$ represents a $C_1$–$C_{16}$ alkyl radical, preferably a $C_6$–$C_{16}$-alkyl radical,
$R^2$ represents H or a $C_1$–$C_{16}$-alkyl radical, preferably H,
$R^3$ represents H or methyl,
n represents a number from 10 to 50, preferably 15 to 30, (C) from 40 to 90% by weight, preferably from 55 to 85% by weight of at least one emulsifier having an HLB-value $\geq 15$ and of the general structure:

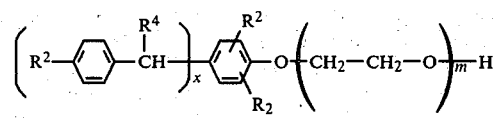

whereby
$R^2$ is respectively defined as above,
$R^4$ represents $C_1$–$C_4$-alkyl,
x is a number from between 2.0 and 3.0 and
m is a number from 15 to 100, preferably from 25 to 70, the total of the percentage contents of A, B and C being 100%.

The systems of the invention are surprisingly characterised by a high stability, a good storability and an outstanding processibility.

Using the emulsifying system of the invention, all mono- and polyfunctional 1,2-epoxide compounds which are practically water-insoluble, in the molecular weight range $\overline{M}n$ of from between 150 and 3000, can be dispersed individually or as mixtures. The dispersion of polyfunctional 1,2-epoxide compounds is particularly interesting technically; the compounds can be converted into cross-linked materials e.g. coatings by suitable known hardening components.

Examples of suitable water-insoluble 1,2-epoxide compounds are:

(a) mono- and poly gycidyl ethers of mono- and poly valent phenols, particularly monomeric diglycidyl ethers of bisphenol A as well as its higher condensation products which are prepared in a known manner, e.g. from bisphenol A and epichlorohydrin; halogenated and alkylated diglycidyl ethers of bisphenol A, e.g. of tetrabromo bisphenol A or tetramethyl bisphenol A and higher-molecular weight condensation products of these digycidyl ethers.

(b) Polyglycidyl ethers of novolaks, i.e. of reaction products of mono or polyvalent phenols with aldehydes, particularly formaldehyde, in the presence of acidic catalysts, particularly of novolaks of the phenol and the cresols.

(c) Cycloaliphatic 1,2-polyepoxides, obtained by epoxidising cyclic diolefins with per-acids, for example of the type:

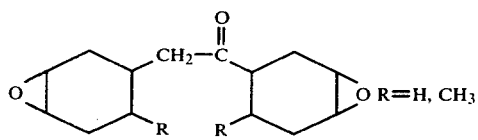

as they are suggested in Houben-Weyl, Methoden der Organischen Chemie, 1963, Vol. 14/1, P. 486 and in the literature cited there.

(d) Glycidyl esters of cycloaliphatic or aromatic dicarboxylic acids, e.g. hexahydrophthalic acid diglycidyl esters, phthalic acid diglycidyl esters.

(e) Glycidyl esters of branched $C_9$–$C_{11}$-monocarboxylic acids.

Diglycidyl ethers of bisphenol A and its condensation products of a higher molecular weight having epoxy equivalents of from 170 to approximately 1000 are particularly preferred.

Other examples of suitable epoxide compounds can be found in the "Handbook of Epoxy Resins" by Lee and and Neville, Mc. Grew-Hill Inc. (1967) and in Methoden der Organischen Chemie, Houben-Weyl 1963, Vol. 14/1, P. 462–499.

At least one polyester containing carboxyl groups having an acid number of from 10 to 50 mg KOH/g substance, preferably from 15 to 35 mg KOH/g substance, whereby the carboxyl groups are completely or partially (to at least 30%) neutralised, is used as component A of the emulsifying system.

The term "Polyesters" is understood to designate polycondensates prepared by polycondensation according to known processes from alcohols and carboxylic acids of the type which is defined for example in Römpp's Chemielexikon, Vol. 1, P. 202, Frankh'sche verlagsbuchhandlung, Stuttgart, 1966, or described in D. H. Solomon's The Chemistry of Organic Film-formers, P. 75 to 101, John Wiley & Sons Inc. New York, 1967.

Alcohols which are preferred for the synthesis of polyester A are aliphatic, cycloaliphatic and/or aromatic alcohols having from 1 to 6 and preferably from 2 to 4 OH-groups linked to non-aromatic carbon atoms and from 1 to 24 carbon atoms per molecule, e.g. glycols such as ethylene glycol, propylene glycol, butane diols, neopentylglycol, trimethylpentanediol-1,3, hexanediols, ether alcohols such as di-, tri- and polyethyleneglycols, oxethylated bis-phenols having 2 alkylene oxide esters per molecule, perhydrogenated bisphenols; also trimethylolethane, trimethylolpropane, trimethylolhexane, glycerine, pentaerythrite, dipentaerythrite, dimethylolcyclohexane, mannite and sorbite, monohydric, chain-terminating alcohols such as methanol, propanol, butanol, cyclohexanol, 2-ethyl-hexanol and benzylalcohol.

Alcohols which are particularly preferred are neopentyl glycol, trimethylol propane, dimethylol cyclohexane and perhydrobisphenol and also polyether alcohols.

The polyesters A can contain up to 15% by weight of monofunctional alcohol radicals, based on polyester A, which are incorporated by condensation.

Acidic components which are preferred for the synthesis of polyester A are aliphatic, cycloaliphatic saturated or unsaturated and/or aromatic polybasic carboxylic acids or their anhydrides, preferably di- and tri-carboxylic acids having from 4 to 12 carbon atoms per molecule or their esterifiable derivatives (e.g. anhydrides or esters) e.g. phthalic acid anhydride, isophthalic acid, terephthalic acid, tetrahydro- and hexahydrophthalic acid anhydride, trimellitic acid anhydride, pyromellitic acid anhydride, maleic acid anhydride, fumaric acid, adipinic acid, glutaric acid and succinic acid anhydride, azelaic acid, endomethylenetetrahydrophthalic acid, also halogenated acids, such as chlorophthalic acid and hexachloroendomethylenetetrahydrophthalic acid.

Acidic components which are particularly preferred are phthalic acid, isophthalic acid, tetrahydro and hexahydrophthalic acid, adipinic acid or their anhydrides.

The polyesters A can be constructed solely from polycarboxylic acids and polyalcohols. However, it is also possible to modify them by incorporating monocarboxylic acids.

Monocarboxylic acids which are suitable for the preparation of the polyester A are aliphatic, cycloaliphatic, saturated and unsaturated and/or aromatic monocarboxylic acids having from 6 to 35 carbon atoms per molecule such as benzoic acid, butylbenzoic acid, toluic acid, hexahydrobenzoic acid, abietic acid, lactic acid and fatty acids, their mixtures and esters of the same such as linseed oil, soya oil, wood oil, safflower oil, castor oil, cotton seed oil, peanut oil, tall oil fatty acid, linseed oil fatty acid, soya oil fatty acid, wood oil fatty acid, safflower oil fatty acid, and dehydrated castor oil fatty acid and products obtained from natural, unsaturated oils or fatty acids by conjugation or isomerisation; saturated fatty acids which are preferred are for example coconut fatty acids, α-ethylhexanoic acid, isononanic acid and linear $C_{16}$–$C_{18}$-monocarboxylic acids.

The molecular weights $\overline{Mn}$ of the polyesters A are usually in the range of from between 400 and 4000 (determined by means of vapour pressure osmometry in acetone).

Selection of the type and quantity of the individual raw materials to be condensed into polyester A is determined by the desired molecular weight. The relationships between the molecular weight and the quantity of raw material are described in detail in U. Holfort: Farbe und Lack 68 (1962), P. 513 to 517, P. 598 to 607.

Polyester A can be prepared according to known processes (compare Methoden der Organischen Chemie (Houben-Weyl), Georg Thieme Verlag Stuttgart, 1963, Vol. 14/2, P. 1 to 5, 21 to 23, 40 to 44, or C. R. Martens, Alkyd Resins, Reinhold Plastics Appl. Series, Reinhold Publ. Comp. 1961, P 51 to 59), whereby alcohols, carboxylic acids or their derivatives and optionally oils are reacted preferably in an inert atomosphere, at temperatures from 140° to 260° C. by melt or azetropic esterification. The reaction can thereby be monitored for example by measuring the acid number and the viscosity.

The polycondensation can be carried out in one or more steps, whereby boiling down an oil, or subsequent acidification by reacting with dicarboxylic acid-anhydride into poly semiester can be carried out in a known manner as respectively separate steps.

Polyether-modified polyesters have proved themselves as polyesters A which lead to particularly smooth dispersions. These can be prepared by co-condensing polyalkylene oxide chains directly in the esterification process. Substances of this type are also characterised in the following as emulsifier resin A.

Polyesters A which are preferred, named as emulsifier resins A in the following, consist of a hydrophobe polyester component which optionally oil-modified and a polyalkylene oxide component (hydrophile) optionally terminated by alkoxy groups having from 1 to 4 carbon atoms, the hydrophile having from 6 to 100 and preferably from 10 to 70 alkylene oxide radicals per polyalkylene oxide chain, whereby the polyalkylene oxide component consists of several individual polyalkylene oxide chains and the alkylene group contains from 2 to 4, preferably 2 carbon atoms.

The emulsifier resins A can contain urethane groups in an amount of from 0.1 to 10%, by weight, based on emulsifier resin A. According to a preferred embodiment, the polyalkylene oxides which are blocked on one side (e.g. etherified) are reacted with approximately equimolar quantities of diisocyanate, so that polyalkylene oxides are produced which carry one free isocyanate group per molecule which can then be used for connecting with the part of the emulsifier resin A.

The average molecular weight of the polyesters preferred for the preparation of emulsifier resin A can be in the range of from 400 to 4000 (determined by vapour pressure osmometry in acetone).

The polyalkylene oxides which are used can be homopolyethers, or also copolyethers in block-, or statistical distribution; homopolyethylene oxides are particularly preferred starting materials for the preparation of the emulsifier resins A.

All diisocyanates are considered in principle as the connecting agent between the polyester component and the polyalkylene oxide component.

The polyisocyanates which are readily available commercially are usually particularly preferred e.g. and 2,4- and 2,6-toluylene-diisocyanate and also random mixtures of these isomers ("TDI"), 1,6-hexamethylene diisocyanate, perhydro-2,4'-and/or-4,4'-diphenyl methanediisocyanate and 1-isocyanato-3,3,5-trimethyl-5-isocyanato methyl-cyclohexane.

The polyester A or the emulsifier resin A respectively contain carboxyl groups corresponding to an acid number of from 10 to 50 and preferably from 15 to 35. The carboxyl groups of the polyester A or of the emulsifier resin A respectively can be completely or partially neutralised before mixing with the aqueous phase. Neutralisation agents which are preferred are alkali metal hydroxides, ammonia, primary, secondary and tertiary amines, such as for example ethylamine, di- and triethylamine, mono- di- and triethanolamine, dimethyl ethanolamine, methyl diethanolamine and dimethyl aminomethyl propanol. However, neutralisation can also be carried out by addition into the aqueous phase.

Processes for the preparation of the preferred emulsifier resins A are known; compare German Offenlegungsschrift Nos. 25,28,212; 25,56,621.

Emulsifier resins A lead to particularly smooth dispersions, which resins are produced by preparing a polyester as the hydrophobic component, having an oil content of from 0 to 30% by weight and having an acid of ≦5 and a hydroxyl number of from 50 to 250 mg KOH/g substance, by allowing this to react with the afore mentioned hydrophilic isocyanate component until the NCO-groups have been completely reacted and then acidifying with a di-carboxylic acid anhydride to an acid number of from 15 to 35 and neutralising, either by directly adding an amine into the resin melt or by adding the resin melt into the water phase containing the amine and optionally component B and/or C. In the latter process, the emulsifier resin A together with the emulsifiers B and C result as an aqueous solution or dispersion, as a so-called emulsifier concentrate.

Alkoxylated aliphatically substituted aromatics are used as component B which correspond to the general formula:

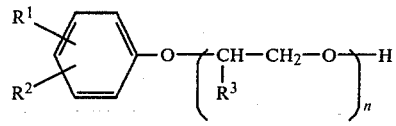

wherein
$R^1$ represents a $C_1$–$C_{16}$-alkyl radical, preferably a $C_6$–$C_{16}$-alkyl radical,
$R^2$ represents H or a $C_1$–$C_{16}$-alkyl radical, preferably H,
$R^3$ represents H or methyl,
n represents a number from 10 to 50, and preferably from 15 to 30.

The number n always represents an average value. Suitable non-iononic emulsifiers have an HLB-value of ≧15, The HLB-concept is explained in Ullmanns Enzyclopaedie der Techischen Chemie, 4th Edition. Vol. 10, P. 462-3, Verlag Chemie Weinheim, 1975.

These emulsifiers are prepared according to known processes by reacting alkyl phenols with an alkylene oxide in the desired molar ratio.

Alkylene oxides which are particularly suitable are ethylene oxide and propylene oxide, whereby these can be condensed in block or statistical distribution, but also as homo polyethers. When the polyether chain is formed from propylene oxide and ethylene oxide, then a block distribution is preferred in which the polypropylene oxide chain is linked to the aromatic ring and the polyethylene oxide chain is linked to the polypropylene oxide chain.

Araliphatically substituted aromatics of the following structure are used as component C:

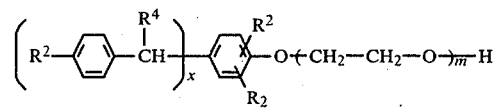

wherein
$R^2$ is as defined above,
$R^4$ represents $C_1$–$C_4$-alkyl
X is a number from between 2.0 and 3.0 and
m is a number of from 15 to 100 and preferably from 25 to 70.

The numbers x and m are always considered here as averages.

Substances of this type are produced by firstly preparing addition products from styrene and/or its derivatives to phenol and/or its derivatives as hydrophobic molecular components and then oxethylating the reaction products. Here, the process can be started using pure products and also product mixtures. These products can be prepared according to German Auslegeschrift No. 1,121,814 and German Offenlegungsschrift No. 2,732,732.

Particularly preferred are products of styrene, phenol and ethylene oxide which correspond to the following formula:

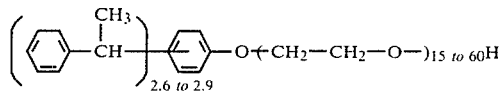

The dispersion according to the invention is prepared by mixing the emulsifiers A,B,C, water and the epoxy resin at from 10° to 95° C. In this embodiment these compounds can be added in any sequence.

It is preferred to submit one or more epoxy resins in liquid form e.g., as a melt and to add thereto under stirring in one or more portions the emulsifiers A, B and C as mixture or single components. The aqueous phase, which can optionally still contain neutralisation agents for emulsifying resin A, is then stirred into the resin phase, initially in small portions and then in larger portions. It is also possible to add one or more emulsifiers A,B or C separately into the aqueous phase. After combining all the components, the dispersion is stirred.

In order to prepare the dispersions according to the invention, it is sufficient to use conventional reactors which are fitted with slow-operating stirring devices. High shearing forces are generally not required for the dispersing process.

The quantities of the constituents to be used in the preparation of the dispersions of the invention are as follows:
from 40 to 55% by weight of one or more epoxy resins,
from 40 to 55% by weight of water,
from 8 to 18% by weight of emulsifying system,
wherein the percentages are based on the total dispersion.

Dispersion having solid contents of from 73 to 48%, by weight are produced by using these amounts. The dispersion can naturally be further diluted by adding water.

The dispersions according to the invention can be combined with other polymers, either during their preparation or subsequently e.g. polyamines, polyketimines, polyacrylates, polyurethanes, resinous polymers e.g. colophonium, xylene-formaldehyde-condensates, aminoplast resins, alkyd resins etc, as described in H. Kittel, Lehrbuch der Lacke und Beschichtungen, Vol. I, Part 1, P. 122-445, Verlag W. A. Colomb, Stuttgart+Berline (1971). These polymers are preferably also used in an aqueous distribution, e.g. in a solution or dispersion.

Small quantities of conventional auxiliary additives can be added to the dispersion, e.g. protective colloids, anti-foaming agents, anti-depositing agents, frost-prevention agents, additives influencing the viscosity, levelling agents and catalysts; however, the compatibility of each of these must be tested. The addition of conventional auxiliary additives generally amounts respectively to from 0.05 to 10% by weight, based on the dispersion.

The systems of the invention are suitable for the preparation of flat and moulded bodies, whereby they are particularly suitable for the preparation of two-dimensional structures, e.g. coatings. The epoxide dispersions of the invention can be used for coatings on numerous backgrounds instead of the conventional epoxy resins applied from the solvent.

Examples of such applications are: priming of metals, varnish coating on metal surfaces, for strengthening and coating of construction material surfaces, e.g. cement; sizing of glass fibres, bonding for plastic and wooden materials, lacquering of wires, producing of carrier plates for electronic and electro-technical components.

The dispersions according to the invention, in contrast to the systems known up till now, offer the advantages of simpler producibility, good handling, freedom from solvent, high storage stability, a good processibility and a wide compatibility with aqueous polymer systems.

The dispersions according to the invention are particularly well suited for coating building materials. They are also outstanding modifiers for other aqueous coating systems because special features of the coatings are acquired when they are used. For example, together with alkyd resin dispersions, they produce coatings having increased chemical-resistance and improved adhesion.

The percentages and parts stated in the Examples relate to the weight if not stated otherwise.

EXAMPLES

Emulsifier resin A 4000 g of a polyethylene oxide alcohol with a molecular weight of 2000, based on n-butanol, are dehydrated for 30 minutes at 120° C. by application of vaccum (15 torr), in a 2 l stirrer cup apparatus, equipped with an internal thermometer, stirrer, dropping funnel and a gas inlet tube. 2 ml of benzoyl chloride are stirred into the solvent-free mixture when it has cooled down to 100° C. 33.6 g of hexamethylene diisocyanate are subsequently added all at once.

After 60 minutes of reaction time, the isocyanate content of the mixture is determined. The NCO- content of the mixture is accordingly from 1.8 to 1.9% of NCO (calculated at 1.94%).

After cooling the melt, the hydrophilic isocyanate component which is suitable for further reactions is obtained as a wax-like, crystalline substance.

134 g of trimethylol propane and 130.7 g of tetrahydrophalic acid anhydride are esterified at 220° C. under a nitrogen atmosphere up to acid number 4. The viscosity of the preliminary stage which was obtained corresponded to a time of outflow (measured as a 60% solution in dimethyl formamide according to DIN 53 211, DIN-Becher 4) of 170 seconds.

500 g of this preliminary stage are dehydrated under vacuum and are then reacted together with 88.2 g of the hydrophilic isocyanate component at from 100° to 105° C., until no more free isocyanate groups can be detected.

580 g of this product are reacted with 39 g of tetrahydrophthalic acid anhydride at 120° C. into a polysemiester having an acid number of approximately 27.

26.1 g of dimethyl ethanolamine are added carefully to 610 g of this polysemiester with stirring at from 95° to 100° C.

Upon cooling, the resin solidifies into a tough elastic fusible substance.

Emulsifier B and emulsifier resin A are combined together in a weight ratio of 3:4 and diluted to form an approximately 45% aqueous, slightly opaque solution having a good flowability and a good handling. This solution is characterised in the following as emulsifier concentrate A/B.

Emulsifier B

Ethylene oxide grafted on nonyl phenol (mol. ratio of 1:20) having the follwing characteristics:

Turbidity point (1% in water): approx. 100° C.
Surface tension (0.1 g/l water): 44.0 dyn/cm
Wetting effect (DIN 53 901): approx. 60 secs at 60° C.
Mp: approx. 30° C.
HLB-value: 16

Emulsifier C 2.8 mols of styrene are condensed with 1 mol of phenol with an acidic catalysis, in an analogous manner to Example 3 of German Auslgeschrift No. 1,121,814, and the product which is obtained is then grafted with 54 mols of ethylene oxide. The resulting product has the following idealised structure:

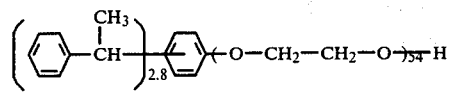

Turbidity point: (1% in 1% phenol solution in water): from 50° to 56° C., HLB-value: 17.2

Emulsifier D 55 parts of nonyl phenol (0.25 mols), 1 part of 50% aqueous sodium hydroxide solution are dehydrated at from 100° to 110° C. under vaccum at 15 torr. 217.5 parts of propylene oxide (3.75 mols) are introduced at a temperature of from 140° to 150° C. At 140° to 150° C., 363 parts (8.25 mols) of ethylene oxide are then added.

A block condensation product is obtained consisting of 1 mol of nonyl phenol, 15 mols of propylene oxide and 22 mols of ethylene oxide.

EXAMPLE 1

416.7 parts of a low-molecular weight epoxy resin based on bisphenol A, epoxide equivalent weight of 190, are stirred homogeneously with 89.5 parts of emulsifier concentrate A/B and 83 parts of emulsifier C at 45° C. under $N_2$. 410.5 parts of water are added in 20 minutes at from 45° to 34° C. with stirring and a homogeneous dispersion having approximately 54% of solids is obtained which is stable for weeks.

EXAMPLE 2

416.7 parts of a solid epoxy resin based on bisphenol A, epoxide equivalent weight of 650, 89.5 parts of emulsifier concentrate A/B, 83.3 parts of emulsifier C are heated under $N_2$ to 75° C. in one hour and are mixed together and 410.5 parts of water are added with stirring at from 75° to 55° C. A homogeneous dispersion is obtained having approximately 53% of solids and which is stable for weeks.

EXAMPLE 3

416.7 parts of glycidyl ester of a α-branched $C_{10}$-fatty acid are stirred under $N_2$ with 89.5 parts of emulsifier concentrate and 83.3 parts of emulsifier C at 45° C., and 410.5 parts of water are then introduced dropwise at from 45° to 40° C. This is again stirred for 30 minutes at from 40° to 45° C. and a stable dispersion is obtained having an approximate 53% solid content.

EXAMPLE 4

416.7 g of a solid epoxy resin based on bisphenol A, epoxide equivalent weight of 475, are stirred under $N_2$ at 80° C. with 89.5 parts of emulsifier concentrate A/B and 83.3 parts of emulsifier C. 410.5 parts of water are then added dropwise for 20 minutes; this was stirred for 20 minutes at from 60° to 50° C. and cooled to room temperature. An approximately 54% stable dispersion is obtained.

EXAMPLE 5

2000 parts of a liquid epoxy resin based on bisphenol A, epoxide equivalent weight of 185, 400 parts of emulsifier concentrate A/B and 400 parts of emulsifier C are homogenised at from 40° to 47° C. under $N_2$. 200 parts of water were then added at from 45° to 38° C. and stirring was continued until this has cooled to room temperature. The homogeneous dispersion which is obtained has an approximate 54% solid content. The epoxide content of the dispersion also remains unchanged when stored for 5 months.

Comparative experiment a 100 parts of a liquid epoxy resin based on bisphenol A, epoxide equivalent weight of 185, were stirred with 8 parts of emulsifier D at 45° C. under $N_2$ and 100 parts of water were then introduced dropwise. The dispersion was unstable and settled within a few hours.

Comparative experiment b

This experiment corresponds to comparative experiment (a), except that the quantity of emulsifier was greatly increased. 100 parts of liquid epoxy resin based on bisphenol A, epoxide equivalent weight of 185 and 29.2 parts of emulsifier D were stirred at 45° C. under $N_2$ and 100 parts of water were then introduced dropwise. The dispersion separated after storing for one day.

The comparative experiments a and b show that epoxy resin dispersions, using emulsifiers according to German Offenlegungsschrift No. 2,213,051 are unstable when the hardener is not added.

Comparative experiment c

A dispersion was prepared according to Example 5 from 200 parts of a liquid epoxy resin based on bisphenol A, epoxide equivalent weight of 185, 7.9 parts of emulsifier B, 40 parts of emulsifier C, 10.5 parts of emulsifier resin A in non-neutralised form and also 200 parts of water. When stored, the dispersion separates within a week.

Analogous results are obtained when respectively 58.4 parts of emulsifier B or emulsifier C, or emulsifier resin A are used alone.

EXAMPLE 6

50 parts of the dispersion from Example 5, 8.3 parts of 3,3'-dimethyl-4,4'-diamino-dicyclohexyl methane and 4.0 parts of benzylalcohol/salicyclic acid 7:1 were mixed to form a lacquer. A film drawn onto a glass plate at 120μ wet film strength was dried overnight at room temperature and then hardened for 24 hours at 50° C. It had a pendulum hardness of 153 sec (DIN 53 157).

EXAMPLE 7

Example 6 was repeated, however, with the addition of 25 parts of a colour paste consisting of:
  80 parts titanium dioxide pigment
  50 parts talc
  100 parts water
  2 parts polyacrylic acid, $NH_4^{\oplus}$-salt, 3% in water.

A film was obtained having 187 sec. pendulum hardness (DIN 53 157).

The materials of Examples 6 and 7 are preferably suitable for sealing cement surfaces. When they have hardened at room temperature, they form hard scratch-resistant, tough, elastic coatings, having a good chemical resistance.

EXAMPLE 8

This Example shows the use of the dispersion of the invention in formulating glass fibre sizes.

According to known methods (see also K. L. Loewenstein: The Manufacturing Technology of Continuous Glass Fibres, Verlag Elsevier Scientific Publishing Comp., Amsterdam, London N.Y. (1973)), glass fibre sizes of the following formulation were produced. The figures relate respectively to the solids:

- 2.5% by weight of the polyester urethane dispersion according to German Offenlegungsschrift No. 2,551,094.
- 2.5% by weight of the dispersion of Example 2.
- 0.5% by weight of α-aminopropyltriethoxy silane
- 0.5% by weight of block-copolymer from ethyleneoxide and propylene oxide.

Glass fibres produced by known methods were provided with this size by application from rollers and were dried. The fibres can be processed without any difficulties, and are easy to chop. The chopped strands exhibit only slight filamentisation, a good binding and have a low bulk volume and also a good dosability. They have a good strengthening behaviour in conventional thermoplastics and in cement products.

We claim:

1. An aqueous dispersion of an epoxide compound comprising 40 to 50% by weight of water, 40 to 50% by weight of one or more water-insoluble 1,2-epoxide compounds having mol weights $\overline{M}n$ of from between 150 and 3000 and 8 to 18% by weight of an emulsifying system comprising:

(A) from 9.5 to 35% by weight of at least one polyester resin containing carboxyl groups having an acid number of from 10 to 50 mg KOH/g substance and a molecular weight $\overline{M}n$ of from 400 to 4000, at least 30% of the carboxyl groups being neutralised;

(B) from 0.5 to 25% by weight of at least one emulsifier having an HLB-value $\geq 15$ and represented by the formula:

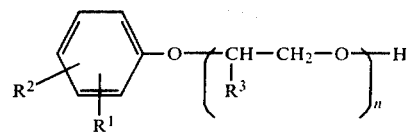

wherein
$R^1$ represents a $C_1-C_{16}$-alkyl group,
$R^2$ represents H or a $C_1-C_{16}$-alkyl group,
$R^3$ represents H or methyl,
n represents a number from 10 to 50;

(C) from 40 to 90% by weight of at least one emulsifier having an HLB-value of $\geq 15$ and the general formula:

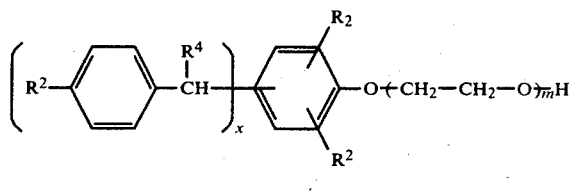

wherein
$R^2$ is previously defined,
$R^4$ represents $C_1-C_4$-alkyl group,
x is a number of from 2.0 to 3.0 and
m is a number from 15 to 100, the total of the percentage contents from A,B and C being 100%.

2. An aqueous dispersion according to claim 1 wherein the emulsifying system comprises from 10 to 30% by weight of component (A).

3. An aqueous dispersion according to claim 1, wherein the emulsifying system comprises from 5 to 15% by weight of component (B).

4. An aqueous dispersion according to claim 1, wherein the emulsifying system comprises from 55 to 85% by weight of component (C).

5. An aqueous dispersion according to claim 1, wherein the water-insoluble 1,2-epoxide compounds are selected from diglycidyl ethers of bisphenol A and its condensation products having epoxy-equivalent of from 170 to 1000.

6. An aqueous dispersion according to claim 1, wherein the component A is a polyether-modified polyester.

* * * * *